US009472798B2

(12) United States Patent
Masuda et al.

(10) Patent No.: US 9,472,798 B2
(45) Date of Patent: Oct. 18, 2016

(54) ENERGY STORAGE DEVICE

(71) Applicant: GS Yuasa International Ltd., Kyoto-shi, Kyoto (JP)

(72) Inventors: Masaki Masuda, Kyoto (JP); Taro Yamafuku, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 285 days.

(21) Appl. No.: 13/864,126

(22) Filed: Apr. 16, 2013

(65) Prior Publication Data

US 2013/0273416 A1 Oct. 17, 2013

(30) Foreign Application Priority Data

Apr. 17, 2012 (JP) ................................ 2012-093898

(51) Int. Cl.
*H01M 2/30* (2006.01)
*H01M 2/06* (2006.01)
*H01M 10/052* (2010.01)

(52) U.S. Cl.
CPC ................ *H01M 2/30* (2013.01); *H01M 2/06* (2013.01); *H01M 10/052* (2013.01)

(58) Field of Classification Search
CPC ...................................................... H01M 2/30
USPC ......................................................... 429/179
See application file for complete search history.

(56) References Cited

U.S. PATENT DOCUMENTS 7,341,802 B1 * 3/2008 Ota et al. ..................... 429/181
2003/0143460 A1 * 7/2003 Yoshida et al. ............... 429/181
2010/0081048 A1 * 4/2010 Nansaka et al. .............. 429/158
2010/0310927 A1 * 12/2010 Imai et al. .................... 429/174
2011/0104566 A1 * 5/2011 Byun et al. ................... 429/211

FOREIGN PATENT DOCUMENTS

JP 2004-14173 A 1/2004
JP 2009-259524 A 11/2009
JP 2010-232187 A 10/2010
JP 2011-76829 A 4/2011

* cited by examiner

*Primary Examiner* — James Lee
(74) *Attorney, Agent, or Firm* — McGinn IP Law Group, PLLC

(57) ABSTRACT

An energy storage device includes a casing, a power generating element, a current collector, a connection conductor, an external terminal, and a rivet. The energy storage device further includes a welded portion where at least one of a contact portion between a casing inner portion of the rivet and the current collector, a contact portion between a casing outer portion of the rivet and the connection conductor, and a contact portion between the connection conductor and the external terminal is welded at least partially.

14 Claims, 3 Drawing Sheets

ENERGY STORAGE DEVICE

CROSS-REFERENCE TO RELATED APPLICATION

This application claims priority from Japanese Patent Application No. 2012-093898 filed with the Japan Patent Office on Apr. 17, 2012, the entire content of which is hereby incorporated by reference.

FIELD

The present invention relates to an energy storage device.

BACKGROUND

An exemplary energy storage device includes a casing, a power generating element accommodated in the casing, a current collector conducted to at least one of positive and negative electrodes (also called positive and negative plates) in the power generating element, and an external terminal disposed on an outer surface of the casing and conducted to the current collector. As an example of energy storage device of this type, there has been known a nonaqueous electrolyte secondary battery (lithium ion secondary battery) disclosed in JP-A-2010-232187.

This battery has a plurality of power generating elements connected parallely to each other. More specifically, the power generating elements each have positive and negative plates and an insulating separator wound together with the plates. The wound objects (power generating elements) thus obtained each have a center axis and a radial direction perpendicular to the center axis. The power generating element has a flat cylindrical shape in cross section in the radial direction (hereinafter, also referred to simply as a flat cylindrical power generating element). Portions extracting the positive and negative electrodes from the power generating element (electrode extraction structure) have positive and negative current collecting connectors conductively connected correspondingly to the positive and negative electrodes of the power generating element, and positive and negative terminals (terminal bolts). These constituent elements are conductively connected with each other by way of a rivet and a terminal base made of metal.

In such an electrode extraction structure, the terminal base serves as a support member supporting the external terminal to keep constant strength, and also serves as a conductive member. More specifically, the terminal base and the current collecting connector are conductively connected with each other by way of a rivet. The rivet also serves as a portion fixing the terminal base and the current collecting connector to a lid.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An energy storage device includes: a casing; a power generating element accommodated in the casing and having positive and negative electrodes; a current collector conducted to at least one of the positive and negative electrodes in the power generating element; a connection conductor disposed on an outer surface of the casing; an external terminal disposed on the outer surface of the casing; and a rivet penetrating and fixed to the outer surface of the casing so as to conductively connect the external terminal and the current collector by way of the connection conductor; wherein at least one of a contact portion between a casing inner portion of the rivet and the current collector, a contact portion between a casing outer portion of the rivet and the connection conductor, and a contact portion between the connection conductor and the external terminal has a welded portion.

BRIEF DESCRIPTION OF THE DRAWINGS

The foregoing and other features of the invention will become apparent to one skilled in the art to which the present invention relates upon consideration of the invention with reference to the accompanying drawings, wherein.

DESCRIPTION OF EMBODIMENTS

Figure 1:
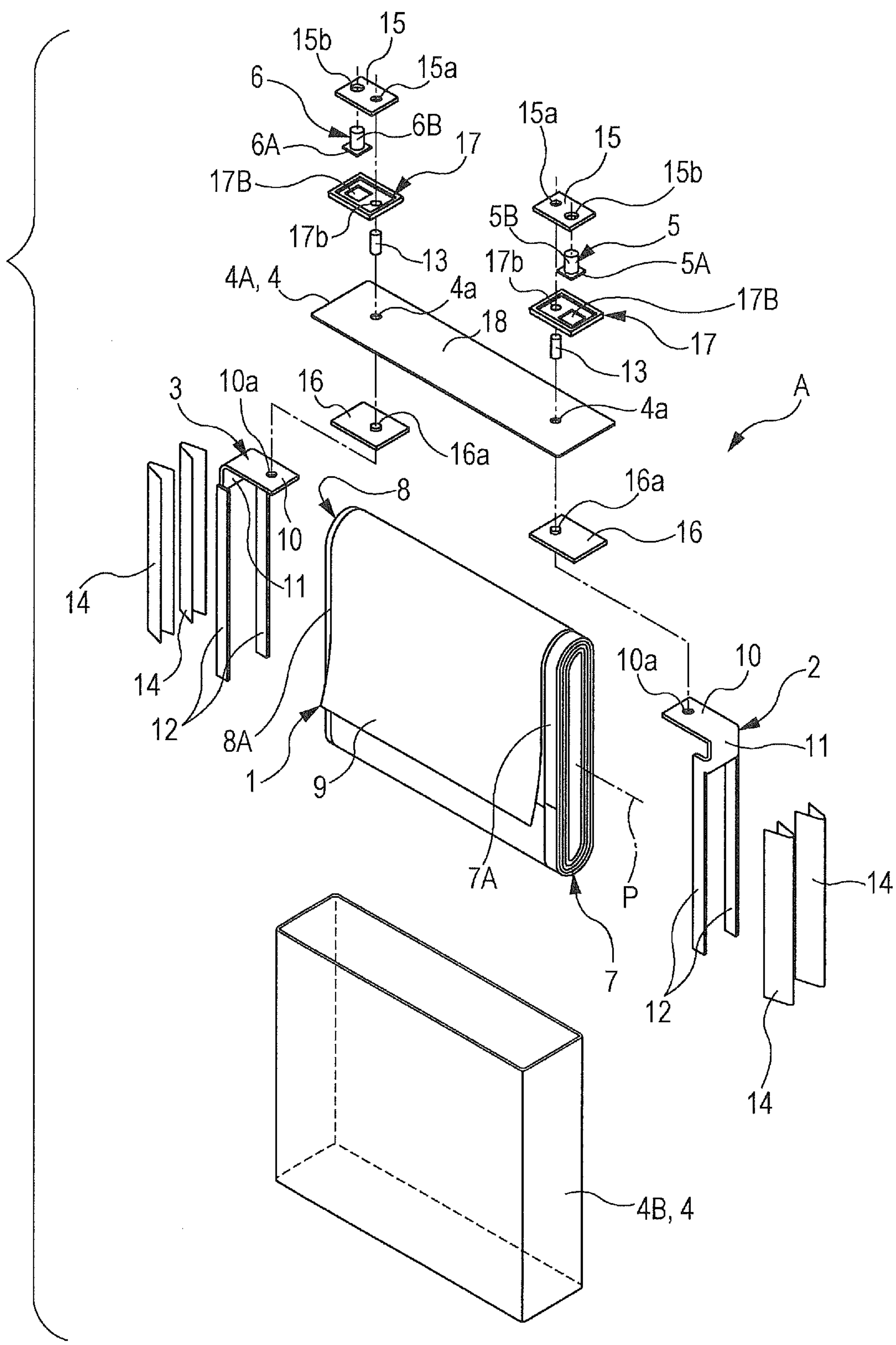
FIG. 1 is an exploded perspective view of a lithium ion secondary battery as an example of an energy storage device according to an embodiment of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the conventional energy storage device, the conductive members are conductively connected with each other by caulking with use of a rivet or by pressure welding such as press fitting. Contact resistance between the conductive members can be varied with time due to vibration, creep of the material, and the like. Furthermore, it has been generally known that a battery may generate heat when large current continuously flows due to outside short circuit or the like.

In an energy storage device in which a power generating element and an external terminal are conductively connected with each other with use of a plurality of conductive members, heat tends to be generated at a connection portion between the conductive members (between a rivet and a current collecting connector, for example) where contact resistance possibly varies. When temperature repeatedly rises and falls at such a connection portion, contact resistance increases and decreases more significantly. In other words, contact resistance varies more significantly and more heat is generated. As a result, this can possibly lead to defects such as melt of the conductive member by the heat thus generated.

It is an object of the present invention to provide an energy storage device that is less likely to generate heat at a connection portion between conductive members, while an electrode of a power generating element and an external terminal are conductively connected with each other with use of a plurality of conductive members.

Preferred embodiments of the present invention will be described hereinafter. Described below with reference to the drawings is a lithium ion secondary battery as a typical nonaqueous electrolyte secondary battery, which exemplifies an energy storage device according to an embodiment of the present invention. Hereinafter, description is made to a pair of current collectors 2 and 3 and the structures thereof by basically referring only to one (a positive electrode portion) of the current collectors. Constituent elements in the other one (a negative electrode portion) of the current collectors are denoted by corresponding reference signs and are regarded as being described similarly. In the following description, the expression "inner side" refers to an inner surface of a casing or a direction toward the inside of the casing. On the other hand, the expression "outer side" refers to an outer surface of the casing or a direction toward the outside of the casing. An "inner surface" of a lid refers to a surface facing an opened surface of a casing (surface in contact with the lid), whereas an "outer surface" or an "upper surface" of the lid refers to a surface opposite to the opened surface of the casing (surface in contact with the lid).

First Embodiment

FIG. 1 is an exploded perspective view of a lithium ion secondary battery A according to the first embodiment of the present invention. The lithium ion secondary battery (hereinafter, also referred to simply as a battery) A includes a casing 4, a power generating element 1, current collectors 2 and 3, connection conductors 15, external terminals 5 and 6, and rivets 13. The power generating element 1 is accommodated in the casing 4 and has a positive electrode 7 and a negative electrode 8. The current collectors 2 and 3 are conducted to at least one of the positive electrode 7 and the negative electrode 8 in the power generating element 1. The connection conductors 15 are disposed on an outer surface of the casing 4. The external terminals 5 and 6 are disposed on the outer surface of the casing 4. The rivets 13 penetrate to be fixed to the outer surface of the casing so as to conductively connect the external terminals 5 and 6 and the current collectors 2 and 3 by way of the connection conductors 15, respectively. There is also included a welded portion where at least one of contact portions between the current collectors 2 and 3 and casing inner portions of the rivets 13, contact portions between the connection conductors 15 and casing outer portions of the rivets 13, and contact portions between the connection conductors 15 and the external terminals 5 and 6 are welded at least partially.

Constituent elements of the battery A are described in more detail below. The casing 4 has a main body 4B and a lid 4A covering an opened portion of the main body 4B. In other words, one of outer surfaces of the main body 4B corresponds to the lid 4A. The casing 4 has a bottomed cylindrical shape, and more particularly, a bottomed rectangular pipe shape (a substantially rectangular parallelepiped shape). The main body 4B is made of aluminum alloy and accommodates the power generating element 1, an electrolyte (not shown), and the like. The lid 4A is a plate member in a belt shape and is made of aluminum or aluminum alloy. The positive electrode terminal (external terminal) 5 and the negative electrode terminal (external terminal) 6 are attached to an outer surface of the lid 4A. The lid 4A has a flat rectangular shape and configures the upper surface of the casing 4 provided with the positive and negative external terminals 5 and 6. The main body 4B and the lid 4A are welded to each other by laser welding or the like so as to form the casing 4. The casing 4 has a bag shape made of insulating synthetic resin, for example. The power generating element 1, the pair of current collectors 2 and 3, and the like are accommodated in this bag.

The power generating element 1 is of the so-called winding type. More specifically, the power generating element includes a positive plate (polar foil) 7, a negative plate (polar foil) 8, and two separators (insulating members) 9 provided between these plates 7 and 8. In the power generating element 1, these constituent elements are laminated and wound together. The power generating element 1 is thus formed into a flat shape (a flat cylindrical shape when seen along a winding axis P) so as to conform to the shape of the casing 4. The positive plate 7 has an aluminum foil substrate in a belt shape and a positive active material layer provided on the substrate. The positive plate 7 has a longitudinal (lateral) end provided with an active material layer unformed portion 7A that is provided with no positive active material layer. The negative plate 8 has a copper foil substrate in a belt shape and a negative active material layer provided on the substrate. The negative plate 8 has a longitudinal (lateral) end provided with an active material layer unformed portion 8A that is provided with no negative active material layer. In the power generating element 1 of a four layered product structure, the positive plate 7 and the negative plate 8 are displaced from each other along the winding axis P.

Examples of the positive active material include a known material that absorbs and discharges lithium ions. More specifically, the positive active material can be lithium-containing transition metal oxide having an $\alpha$-$NaFeO_2$ structure obtained by substituting transition metal such as Ni or Mn or boron for part of $LiCoO_2$ or Co, a compound having a spinel type crystal structure represented by $LiMn_2O_4$, $LiFePO_4$, $LiFeSO_4$, or a polyanion type compound obtained by substituting Co, Mn, or the like for part of Fe.

The positive current collector 2 made of aluminum or aluminum alloy is configured similarly to the negative current collector 3 made of copper or copper alloy. The positive current collector 2 is described below out of these current collectors 2 and 3. As shown in FIG. 1, the positive current collector 2 has a plurality of portions formed by bending and cutting a plate member. More specifically, the current collector 2 has a lateral plate portion 10, a lengthwise plate portion 11, and a pair of current collecting plate portions 12 and 12. The lateral plate portion 10 is locked to the lid 4A. The lengthwise plate portion 11 extends perpendicularly downward from an end of the lateral plate portion 10. The pair of current collecting plate portion 12 and 12 each have a belt shape, are bent inward at 90 degrees from lower lateral ends of the lengthwise plate portion 11, and extend downward.

The lateral plate portion 10 has an end connected with the lengthwise plate portion 11, an opposite end (free end), and a hole 10*a* provided at the free end. The lateral plate portion 10 is conductively connected to the positive external terminal 5 with use of (by way of) the rivet 13 inserted through the hole 10*a* and the like. The pair of current collecting plate portions 12 and 12 extending downward from the lower end of the lengthwise plate portion 11 nip a plurality of sections of the positive active material layer unformed portion 7A. The current collecting plate portions 12 and 12 are fixed to the active material layer unformed portion 7A with use of metal clips 14 and are conductively joined to the active material layer unformed portion 7A. More specifically, the current collecting plate portions 12 and 12 collect the lengthwise sections of the active material layer unformed portion 7A. The collected sections are nipped by the clips 14. Subsequently, the clips 14 nipping the plurality of sections of the active material layer unformed portion 7A and the current collecting plate portions 12 and 12 are superposed together. These members are then conductively joined together by ultrasonic welding or the like. The clips 14 for the positive electrode portion are made of aluminum or aluminum alloy, whereas the clips 14 for the negative electrode portion are copper plates.

Described next is the structure of the conductive connection portions between the power generating element 1 and the positive and negative external terminals 5 and 6. The positive and negative conductive connection portions are configured similarly to each other. Representatively described herein is the conductive connection portion with the positive external terminal 5.

As shown in FIG. 1, the positive current collector 2 and the positive external terminal 5 are conductively connected with each other by way of (with use of) the rivet 13 and the connection conductor 15 in a plate shape. The rivet 13 for the positive electrode portion is made of aluminum or aluminum alloy. The rivet 13 caulks four members at one time. Namely, these members correspond to the lateral plate portion 10, the lid 4A, an inner gasket 16, and an outer gasket (also referred to as a sealing member) 17. The inner gasket 16 is an insulating plate member that is interposed between the lateral plate portion 10 and the lid 4A. The sealing member 17 is also an insulating plate member. The rivet 13 conductively connects these members with the current collector 2, as well as fixes and supports the current collector 2 and the sealing member 17 to the lid 4A.

The connection conductor 15 is inserted through an upper portion of the rivet 13. By caulking the rivet 13, the connection conductor 15 is conductively connected and supported to the rivet 13. In other words, the connection conductor 15 is firmly supported to the lid 4A with use of the rivet 13. The external terminal 5 has a lower portion accommodated in the sealing member 17 and is forcibly fitted into the connection conductor 15. The external terminal 5 is thus eventually firmly supported to the lid 4A.

The conductive connection structure is described in more detail with reference to FIG. 2. The rivet 13 has an upper portion 13*a*, an intermediate portion 13*b*, and a lower portion 13*c*. The upper portion 13*a* of the rivet has a columnar shape (an example of the casing outer portion). The intermediate portion 13*b* of the rivet is located between the upper portion 13*a* and the lower portion 13*c*, and is larger in diameter than the upper portion 13*a*. The lower portion 13*c* of the rivet (an example of the casing inner portion) is hollow in cross section. More specifically, the lower portion 13*c* of the rivet has a cylindrical shape and an outer diameter same as that of the upper portion 13*a*. For the purpose of simplification, the rivet 13 shown in FIG. 1 has a schematically columnar shape. The inner gasket 16 in a belt plate shape is an insulating member made of synthetic resin or the like, and has a through hole 16*a* at an inner end in the lateral direction.

As described earlier, the sealing member 17 mounted on the upper surface of the lid 4A is an insulating plate member, and is made of synthetic resin or the like. The sealing member 17 has a main frame 17A in a substantially unlidded box shape, an upward projecting portion 17B, and a cylindrical portion 17C extending downward. The main frame 17A has a bottom wall 17*a* and four side walls 17*b*. The upward projecting portion 17B having a rectangular shape in planar view rises from the bottom wall 17*a*. The cylindrical portion 17C provided with a circular hole 17*c* penetrating lengthwise extends perpendicularly downward from the bottom wall 17*a* of the main frame 17A. The cylindrical portion 17C is designed to pass through and be fitted into a circular hole 4*a* provided in the lid 4A.

The external terminal 5 is a member made of aluminum or aluminum alloy. The external terminal 5 has a base portion 5A in a bottomless rectangular parallelepiped shape and a terminal portion 5B in a bolt shape provided with a male thread. The base portion 5A of the external terminal 5 is externally fitted to the upward projecting portion 17B and the external terminal 5 is accommodated. The external terminal 5 thus accommodated is mounted on the sealing member 17 so as not to turn about a lengthwise axis (not shown).

The connection conductor 15 is a rectangular plate member made of aluminum or aluminum alloy. The connection conductor 15 is provided with a first hole 15*a* used for inserting the upper portion 13*a* of the rivet and a second hole 15*b* used for inserting the terminal portion 5B.

The conductive connection portion between the power generating element 1 and the positive or negative external terminal 5 or 6 is assembled in the following manner. Initially, the cylindrical portion 17C of the sealing member 17 is inserted through the circular hole 4*a* in the lid 4A so as to be fitted thereinto. The portion of the cylindrical portion 17C projecting downward from the lid 4A is then fitted into the through hole 16*a*. Thereafter, the inner gasket 16 is disposed on the lower surface of the lid 4A.

Thereafter or at the same time, the lower portion 13*c* of the rivet is inserted into the circular hole 17*c* in the cylindrical portion 17C, so that the rivet 13 is attached to the sealing member 17. The lower portion 13*c* of the rivet projecting downward is then inserted through the hole 10*a* and the current collector 2 is disposed below the inner gasket 16. The lower portion 13*c* of the rivet is caulked in this state. Preferably, the bottom surface (denoted by no reference sign) of the sealing member 17 and the upper surface (an example of the casing outer surface) 18 of the lid 4A are bonded to each other by an adhesive agent or the like.

There is formed an annular caulked portion 13*d* by such caulking. The lateral plate portion 10 of the current collector 2, the inner gasket 16, the lid 4A, and the bottom wall 17*a* are nipped and pressure welded between the annular caulked portion 13*d* and the intermediate portion 13*b* of the rivet. This leads to a state where the three members, namely, the sealing member 17, the inner gasket 16, and the current collector are supported to the lid 4A (see FIG. 2).

Figure 2:
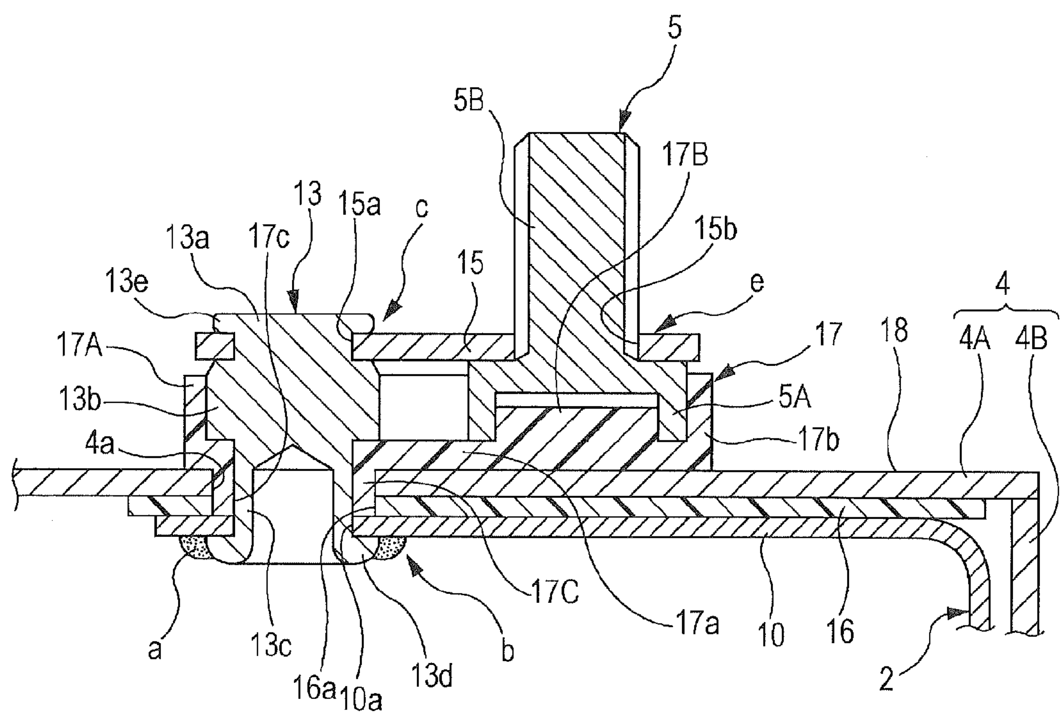
FIG. 2 is an enlarged sectional view of a conductive connection portion where a first conductive portion is soldered by aluminum solder in a storage battery (a first embodiment)

Thereafter, as shown in FIG. 2, the base portion 5A is externally fitted to the upward projecting portion 17B. The second hole 15*b* in the connection conductor 15 is forcibly and externally fitted (close fitting, press fitting, or the like) to the terminal portion 5B of the external terminal 5 mounted on the sealing member 17. The connection conductor 15 is then shifted downward along the terminal portion 5B, so that the first hole 15*a* in the connection conductor 15 is externally fitted to the upper portion 13*a* of the rivet. Furthermore, the connection conductor 15 is forcibly shifted downward to a predetermined position. At the predetermined position, the upper surface (denoted by no reference sign) of the base portion 5A and the upper surface (denoted by no reference sign) of the intermediate portion 13*b* of the rivet are brought into contact with each other.

In this state where the upper surface (denoted by no reference sign) of the base portion 5A and the upper surface (denoted by no reference sign) of the intermediate portion 13*b* of the rivet are made in contact with each other, the upper portion 13*a* of the rivet is caulked to pressure weld and retain the connection conductor 15 between an upper caulked portion 13*e* and the intermediate portion 13*b* of the rivet. As a result, the external terminal 5 is pressed downward and locked to be fixed to the sealing member 17 so as not to turn and disengage upward. At the same time, the external terminal 5 and the current collector 2 are conductively connected with each other by way of the connection conductor 15 and the rivet 13 (see FIG. 2).

There are thus provided three conductive connection portions of such a structure. Namely, there are provided a first conductive portion b where the current collector 2 and the rivet 13 are pressure welded, a second conductive portion c where the rivet 13 and the connection conductor 15 are pressure welded, and a third conductive portion e where the connection conductor 15 and the external terminal 5 are pressure welded. There possibly occurs the following phenomenon due to creep of the material with time or external vibration (vibration by travelling, for example). The pressure welded states at the three conductive portions b to e are possibly weakened to cause defective connection in which contact resistance increases or significantly increases and decreases, or the members are not fixed firmly. As a result, defective connection is likely to occur in the energy storage device A that is mounted on a travelling vehicle such as an automobile subjected to vibration by travelling.

If large current flows to the conductive portions b to e having defective connection, heat is generated at the conductive portions b to e due to Joule heat. Such heat generation can lead to defects such as temperature rise or melt of the conductive member. In order to prevent these defects beforehand, weld penetration (such as welding, brazing, or soldering) can be applied to the conductive portions b to e, particularly to the first and second conductive portions b and c that are simply pressure welded.

Soldering is desired because it is simple, cheep, and does not cause deformation of the conductive member such as the rivet 13. Soldering is capable of reliably preventing the defective phenomena. However, ordinary soldering is not applicable to the first and second conductive portions b and c in the positive electrode portion, which are entirely made of aluminum. In this case, aluminum solder is employed. When the conductive portions b to e are soldered by aluminum solder (such as a portion denoted by reference sign “a” in FIG. 2), pressure welding is not required. It is thus possible to simplify assembling and reduce cost therefor.

Inside (such as the first conductive portion b) the casing 4 of the battery, it is preferred to prevent melt into an electrolyte (electrolyte solution) or infiltration of water into a contact surface between metals of different types. It is thus desired to cover and protect an aluminum soldered portion (aluminum solder welded portion) with resin (synthetic resin) such as epoxy.

As shown in FIG. 2, in the lithium ion secondary battery A according to the first embodiment, the conductive connection portion (namely, the first conductive portion b) between the current collector 2 and the rivet 13 is soldered by aluminum solder a. The aluminum solder a can be provided entirely on the outer periphery of the annular caulked portion 13*d*, or can be soldered partially. The lateral plate portion 10 and the annular caulked portion 13*d* are not pressure welded but are integrated so as to be conducted with each other by such soldering. It is thus possible to eliminate defective connection due to vibration or creep of the material, as well as tendency to generate heat in accordance with increase in contact resistance. In other words, even if large current flows for some reason, the first conductive portion b provided with the aluminum solder does not generate heat, resulting in excellent durability and reliability of the energy storage device.

Such aluminum solder reduces or eliminates increase in resistance due to weakened pressure welding by vibration. The lithium ion secondary battery A can be alternatively designed such that, when the lithium ion secondary battery A generates heat, the aluminum solder welded portions (namely, the conductive portions b to e) melt at around the melting point of the solder to cut the conductive joint. When the lithium ion secondary battery A thus designed generates heat for some reason, the aluminum solder melts at predetermined high temperature (e.g. 235° C. as the melting point of aluminum solder) to block conductivity. In other words, the aluminum solder serves as a fuse to prevent beforehand further heat generation due to a further flow of current.

The positive electrode portion can be electrically connected by alloy having solidus temperature of 200° C., liquidus temperature of 235° C., and containing 80 to 90% of tin and 10 to 20% of zinc. It is possible to apply aluminum solder to the conductive portions b to e made of copper in the negative electrode portion. However, aluminum used at the conductive portions b to e in the positive electrode portion has heat conductivity higher than that of copper. It is thus more effective to employ aluminum in the positive electrode portion.

In a case where the connection conductor 15 is a copper plate coated with nickel, the connection conductor 15 and the rivet 13 made of aluminum are caulked to be electrically connected with each other. There is, however, a difference in potential between aluminum and nickel. This possibly causes electrolytic corrosion. In such a case, when aluminum solder is employed for conductive joint, aluminum solder advantageously reduces electrolytic corrosion because normal potential of aluminum solder is between those of aluminum and nickel.

The conductive portions b to e can be welded alternatively by laser beam welding or the like. However, as compared with laser welding, welding by soldering is excellent in that the joint portion is less likely to be damaged, that contact resistance is decreased, and that the outer gasket (sealing member) is less likely to be damaged by heat.

More specifically, firstly, the joint portion is less likely to be damaged because soldering is flexible enough to absorb stress applied to any one of the conductive portions b to e.

Secondly, as compared with laser welding, soldering increases the contact area between the current collector 2 and the rivet 13 or between the connection conductor 15 and the rivet 13, thereby reducing contact resistance.

Figure 3:
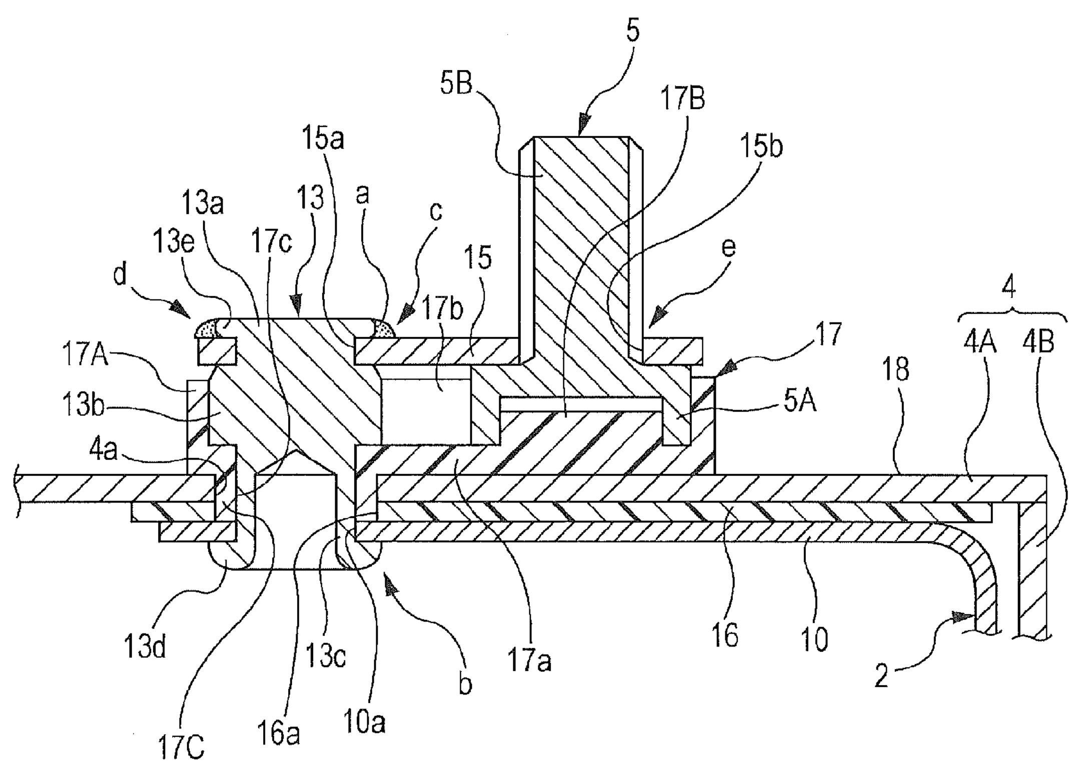
FIG. 3 is an enlarged sectional view of a conductive connection portion where a second conductive portion is soldered by aluminum solder in a storage battery (a second embodiment).

Thirdly, as shown in FIGS. 2 and 3, when the sealing member 17 is disposed near the conductive portions b to e, heat of a laser is conducted to the sealing member 17 by laser welding to the conductive portion, thereby possibly reducing sealing performance. The sealing member is, however, less likely to be damaged by heat because soldering is performed at low temperature.

Second Embodiment

An energy storage device A according to the second embodiment is configured similarly to the energy storage device according to the first embodiment except that aluminum solder a is applied to a different conductive connection portion. More specifically, in the present embodiment, as shown in FIG. 3, the aluminum solder a is applied to the conductive connection portion between the connection conductor 15 and the rivet 13. The aluminum solder a is applied to the first conductive portion b in the first embodiment. On the other hand, the aluminum solder a is applied to the second conductive portion c in the second embodiment.

More specifically, as shown in FIG. 3, the aluminum solder a is applied to solder the peripheral edge of the first hole 15*a* in the connection conductor 15 and the upper caulked portion 13*e*. The aluminum solder a at the second conductive portion c can be provided entirely on the outer periphery of the upper caulked portion 13*e*, or can be soldered partially.

Other Embodiments

Energy storage device according to different embodiments are configured similarly to the energy storage device according to the first or second embodiment except that aluminum solder a is applied to a different conductive connection portion. More specifically, in the present embodiment, soldering with use of aluminum solder a is applied to the third conductive portion e. Alternatively, aluminum solder can be applied to the first to third conductive portions b to e in the negative electrode portion. Still alternatively, the conductive portions b to e in the positive or negative electrode portion can be welded partially (in a pinpointed manner) by utilizing the feature that the melting point of the solder is lower than that of simple metal.

An energy storage device according to a first aspect of the present invention includes a power generating element 1 accommodated in a casing 4, a current collector 2, 3 conducted to at least one of positive and negative electrodes 7 and 8 in the power generating element 1, and an external terminal 5, 6 disposed on an outer surface 18 of the casing 4 and conducted to the current collector 2, 3, wherein the external terminal 5, 6 and the current collector 2, 3 are conductively connected with each other with use of a conductive rivet 13 penetrating from inside to outside the casing 4 so as to be fixed, and the current collector 2, 3 and a casing inner portion 13*c* of the rivet 13 are soldered to each other.

As to an energy storage device according to a second aspect of the present invention, in the energy storage device according to the first aspect, the rivet 13 and the current collector 2, 3 are made of aluminum or aluminum alloy, and the casing inner portion 13*c* of the rivet 13 and the current collector 2, 3 are connected with each other by aluminum solder a.

As to an energy storage device according to a third aspect, in the energy storage device according to the first or second aspect, the casing 4 is made of metal and a sealing member 17 made of resin is interposed between the rivet 13 and the casing 4.

An energy storage device according to a fourth aspect of the present invention includes a power generating element 1 accommodated in a casing 4, a current collector 2, 3 conducted to at least one of positive and negative electrodes 7 and 8 in the power generating element 1, and an external terminal 5, 6 disposed on an outer surface 18 of the casing 4 and conducted to the current collector 2, 3, wherein the current collector 2, 3 and a connection conductor 15 disposed on the outer surface 18 of the casing are conductively connected with each other with use of a conductive rivet 13 penetrating from inside to outside the casing 4 so as to be fixed, the external terminal 5, 6 is conductively connected with and supported by the connection conductor 15, and the connection conductor 15 and a casing outer portion 13*a* of the rivet 13 are connected with each other by soldering.

As to an energy storage device according to a fifth aspect of the present invention, in the energy storage device according to the fourth aspect, the rivet 13 and the connection conductor 15 are made of aluminum or aluminum alloy, and the connection conductor 15 and the casing outer portion 13*a* of the rivets 13 are connected with each other by aluminum solder a.

As to an energy storage device according to a sixth aspect of the present invention, in the energy storage device according to the fourth or fifth aspect, the casing 4 is made of metal, a sealing member 17 made of resin is interposed between the rivet 13 and the casing 4, and the sealing member 17 at least partially surrounds the casing outer portion 13*a* of the rivet 13.

In the energy storage device configured such that the electrode of the power generating element and the external terminal are conductively connected with each other with use of a plurality of conductive members, a conductive portion between the current collector and the rivet, a conductive portion between the rivet and the connection conductor, and a conductive portion between the connection conductor and the external terminal are conducted with each other by pressure welding. There possibly occurs the following phenomenon due to creep of the material with time or external vibration (vibration by travelling, for example). The pressure welded states at the conductive portions are possibly weakened to cause defective connection in which contact resistance increases or significantly increases and decreases, or the members are not fixed firmly. If large current flows during such defective connection, the conductive portions may possibly generate heat, thereby leading to defects such as temperature rise or melt of the conductive member.

In the energy storage device according to one of the aspects of the present invention, the conductive portion between the casing inner portion of the rivet and the current collector is connected by soldering. The conductive portion is thus integrated to be conducted. It is possible to prevent defective connection due to vibration or creep of the material. It is also possible to prevent heat generation due to increase in contact resistance. The energy storage device according to the aspect of the present invention configured as described above is capable of preventing heat generation at the conductive portion connected by soldering even if large current flows for some reason. The energy storage device is thus excellent in durability and reliability. The energy storage device according to the aspect of the present invention configured as described above eliminates as much as possible heat generation at a connection portion between conductive members even though the electrode of the power generating element and the external terminal are conductively connected with each other with use of a plurality of conductive members.

In a case where the rivet, the current collector, and the connection conductor are made of aluminum or aluminum alloy, the connection portion is formed by aluminum solder. This leads to excellent soldering between the members made of aluminum or aluminum alloy, which are generally regarded as being difficult to be soldered, so as to obtain conductive connection.

In this case, there is exerted the following advantage. If the power generating element or the like generates heat to have high temperature for some reason, aluminum solder, which has a low melting point, melts to block conductivity. In other words, aluminum solder serves as a fuse to prevent beforehand further heat generation due to a continuous flow of current.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An energy storage device, comprising:

a casing;

a power generating element accommodated in the casing and comprising positive and negative electrodes;

a current collector conducted to one of the positive and negative electrodes in the power generating element;

an external terminal disposed on an outer surface of the casing;

a rivet penetrating and fixed to the outer surface of the casing so as to conductively connect the external terminal and the current collector; and a connection conductor disposed on the outer surface of the casing, wherein the connection conductor comprises a copper plate coated with nickel, and the rivet comprises aluminum, an aluminum solder welded portion conductively joining the aluminum of the rivet to the nickel of the connection conductor.

2. The energy storage device according to claim 1, wherein the current collector comprises aluminum or an aluminum alloy.

3. The energy storage device according to claim 1, wherein the casing comprises a metal.

4. The energy storage device according to claim 1, wherein a sealing member comprising a resin is interposed between the rivet and the casing.

5. The energy storage device according to claim 1, wherein a casing outer portion of the rivet and the connection conductor are connected with each other by an aluminum solder.

6. The energy storage device according to claim 1, wherein a sealing member at least partially surrounds a casing outer potion of the rivet.

7. The energy storage device according to claim 1, wherein the outer surface of the casing corresponds to a lid of the casing.

8. The energy storage device according to claim 1, wherein the energy storage device comprises a nonaqueous electrolyte secondary battery.

9. The energy storage device according to claim 1, wherein a contact portion between the connection conductor and the external terminal comprises another aluminum solder welded portion.

10. The energy storage device according to claim 1, further comprising another current collector conducted to another one of the positive and negative electrodes in the power generating element.

11. The energy storage device according to claim 1, wherein a contact portion between a casing inner portion of the rivet and the current collector comprises another aluminum solder welded portion.

12. The energy storage device according to claim 11, wherein said another aluminum solder welded portion is welded by aluminum.

13. The energy storage device according to claim 11, wherein said another aluminum solder welded portion is covered with a resin.

14. The energy storage device according to claim 13, wherein the resin comprises an epoxy resin.

* * * * *